(12) United States Patent
Byun (10) Patent No.: US 10,056,579 B2
(45) Date of Patent: Aug. 21, 2018

(54) SECONDARY BATTERY

(71) Applicant: SAMSUNG SDI CO., LTD., Yongin-si, Gyeonggi-do (KR)

(72) Inventor: Bohyun Byun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/292,155

(22) Filed: Oct. 13, 2016

(65) Prior Publication Data

US 2017/0117513 A1   Apr. 27, 2017

(30) Foreign Application Priority Data

Oct. 23, 2015   (KR) .................. 10-2015-0148020

(51) Int. Cl.
*H01M 2/04* (2006.01)
*H01M 2/06* (2006.01)
*H01M 2/30* (2006.01)

(52) U.S. Cl.
CPC ......... *H01M 2/0404* (2013.01); *H01M 2/043* (2013.01); *H01M 2/0456* (2013.01); *H01M 2/06* (2013.01); *H01M 2/30* (2013.01); *H01M 2220/20* (2013.01); *H01M 2220/30* (2013.01)

(58) Field of Classification Search
CPC .. H01M 2/0404; H01M 2/043; H01M 2/0456; H01M 2/06; H01M 2/30; H01M 2220/20; H01M 2220/30
See application file for complete search history.

(56) References Cited

U.S. PATENT DOCUMENTS 8,765,274 B2    7/2014  Lee
2009/0123834 A1*  5/2009  Byun .................. H01M 2/0215
                                                           429/178

FOREIGN PATENT DOCUMENTS

| JP | 2011-108377 A | 6/2011 |
| KR | 10-2008-0020334 A | 3/2008 |
| KR | 10-2011-0057470 A | 6/2011 |

OTHER PUBLICATIONS

Seo et al. KR10-2008-0020334 translation 2017.*
Inagami JP 2011-108377 translation 2017.*

* cited by examiner

*Primary Examiner* — Jane Rhee
(74) *Attorney, Agent, or Firm* — Lee & Morse, P.C.

(57) ABSTRACT

A secondary battery may include a main body including a first surface and a second surface opposite to the first surface, and a cover connected to a side of the main body and including a skirt part eccentric to one of the first and second surfaces, wherein an external terminal is formed in the first surface.

15 Claims, 9 Drawing Sheets

SECONDARY BATTERY

CROSS-REFERENCE TO RELATED APPLICATION

Korean Patent Application No. 10-2015-0148020, filed on Oct. 23, 2015, in the Korean Intellectual Property Office, and entitled: "Secondary Battery," is incorporated by reference herein in its entirety.

BACKGROUND

1. Field

One or more exemplary embodiments relate to a secondary battery.

2. Description of the Related Art

In general, secondary batteries are rechargeable, unlike primary batteries that cannot be recharged. The secondary batteries are used as energy sources in mobile devices, electric vehicles, hybrid vehicles, electric bicycles, uninterruptible power supplies, etc. They may be of a single-battery type or a pack type in which multiple batteries are electrically connected to each other and bound in one unit, according to the types of external devices that use such batteries.

SUMMARY

According to exemplary embodiments, a secondary battery may include: a main body including a first surface and a second surface opposite to the first surface; and a cover connected to a side of the main body and including a skirt part at an eccentric location toward one of the first and second surfaces, wherein an external terminal is formed on the first surface.

The cover may include an inner surface facing the main body and an outer surface opposite to the inner surface, and the skirt part may protrude from the inner surface.

An inner surface of the cover may have an asymmetrical shape.

A reverse insertion protection part may be on the outer surface of the cover.

The reverse insertion protection part may be formed at an eccentric location toward one of the first and second surfaces.

An outer surface of the cover may have an asymmetrical shape.

The skirt part may be at an eccentric location toward the first surface, and the reverse insertion protection part may be at an eccentric location toward the second surface.

The main body may include: an electrode assembly; and a can housing the electrode assembly, and wherein the skirt part may cover a first or second surface of the can.

The skirt part may be selectively located on the cover at an eccentric location toward the first surface, but is not on the cover at an eccentric location toward the second surface.

The cover may include: a pair of long-side surfaces extending in parallel to the first and second surfaces; and a pair of short-side surfaces alternately between the pair of long-side surfaces, and wherein the skirt part may be selectively located on one of long side surfaces of the pair of long-side surfaces.

The skirt part may include at least two skirt parts spaced part from each other along the one of the long-side surfaces.

The secondary battery may further include an external sheet winding the cover and including an opening for exposing the skirt part.

The external sheet may cover a portion of the main body and the skirt part.

The opening may be selectively located in the external sheet covering the main body.

A plurality of skirt parts may be on the cover.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
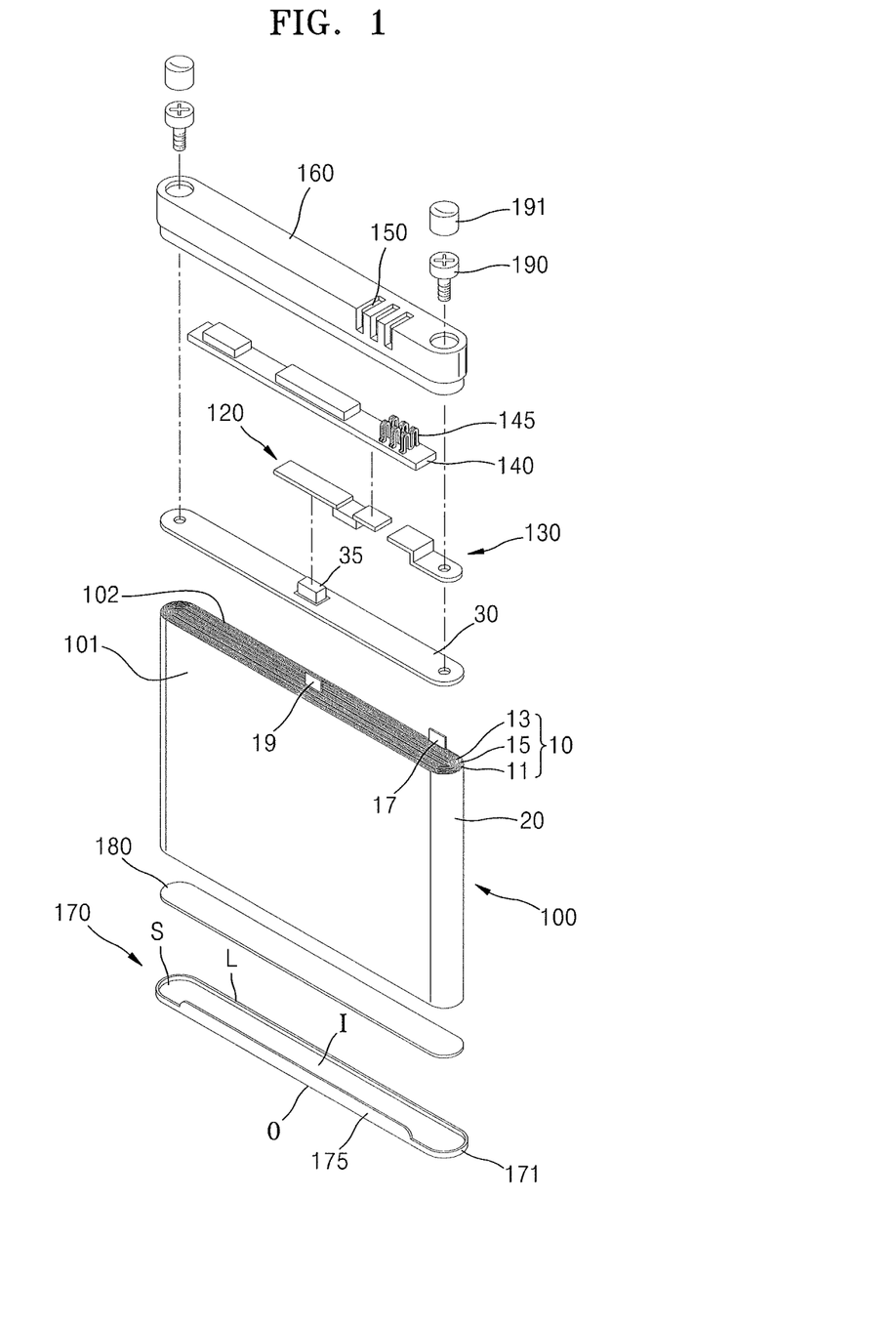
FIG. 1 illustrates a perspective view of a secondary battery according to an exemplary embodiment.
Figure 2:
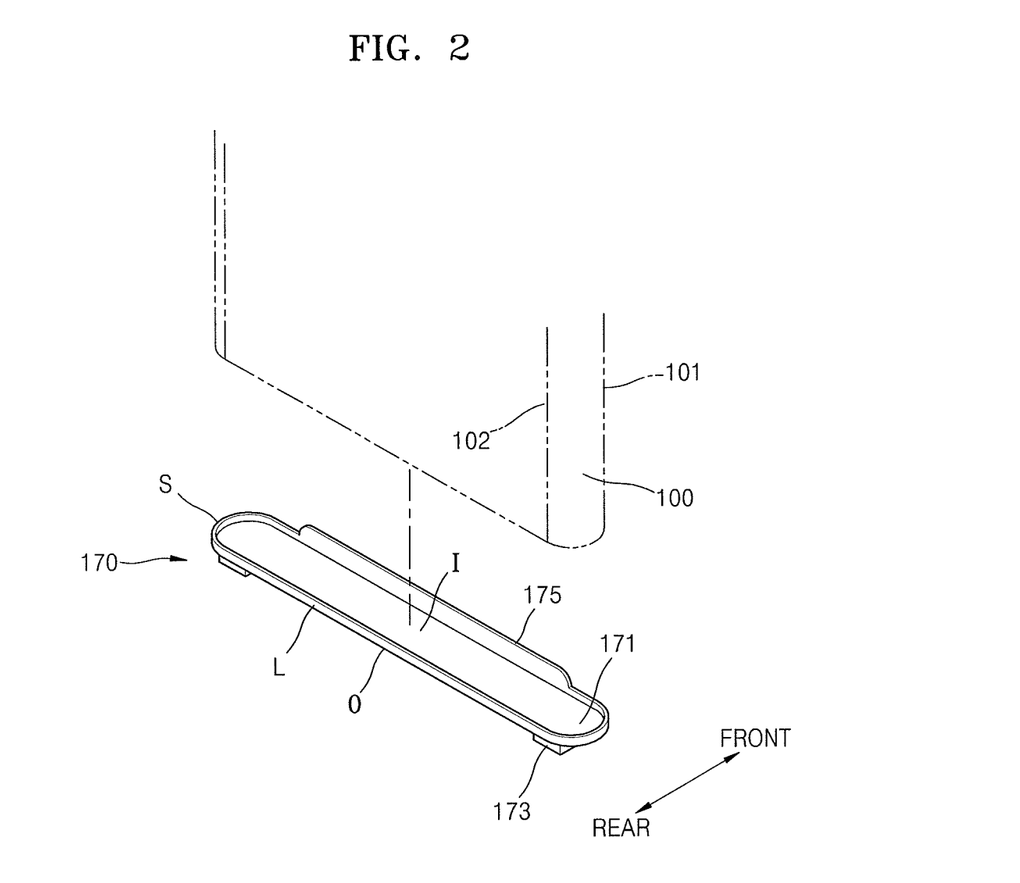
FIG. 2 illustrates a perspective view of a cover of FIG. 1.
Figure 3:
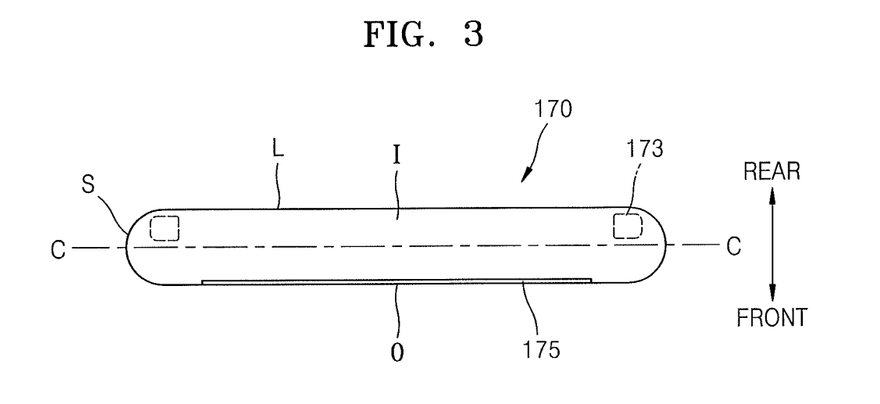
FIG. 3 illustrates a plan view of the cover of FIG. 1.
Figure 4:
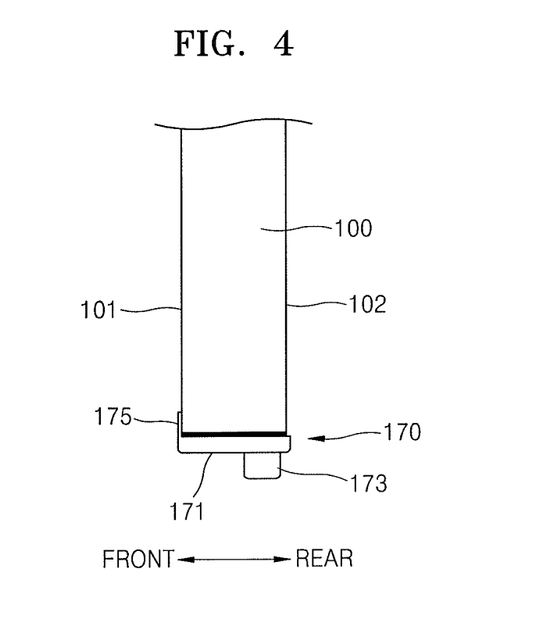
FIG. 4 illustrates a side view of the cover of FIG. 1.

FIG. 1 is a perspective view of a secondary battery according to an exemplary embodiment. FIG. 2 is a perspective view of the cover of FIG. 1. FIG. 3 is a plan view of the cover of FIG. 1. FIG. 4 is a side view of the cover of FIG. 1.

Referring to FIGS. 1 to 4, the secondary battery may include a main body 100 and a cover 170. The main body 100 includes a first surface 101, on which external terminals 150 are open, and a second surface 102 opposite to the first surface 101. The cover 170 is assembled with or connected to a side of the main body 100 and includes a skirt part 175 that is eccentric to one of the first and second surfaces 101 and 102.

The main body 100 may include a can 20 housing an electrode assembly 10 and a cap plate 30 assembled with or connected to an open upper surface of the can 20. The main body 100 may further include a protection circuit board 140 mounted on the cap plate 30 and a case 160 coupled to the cap plate 30 in order to house the protection circuit board 140. The case 160 may be coupled to the cap plate 30 via a coupler 190 that may be covered by a closure 191.

The electrode assembly 10 may include first and second electrode plates 11 and 13 having different polarities, and a separator 15 interposed therebetween. The electrode assembly 10 may be of a jelly-roll type, for example, in which the first and second electrode plates 11 and 13 are rolled with the separator 15 therebetween. In another exemplary embodiment, the electrode assembly 10 may be a stack type, for example, in which the first and second electrode plates 11 and 13 of a sheet type are stacked with the separator 15 therebetween.

The electrode assembly 10 may include first and second electrode tabs 17 and 19 protruding from the first and second electrode plates 11 and 13, respectively. The first and second electrode tabs 17 and 19 may be respectively electrically connected to the cap plate 30, forming a first electrode, and a second electrode 35 protruding from the cap plate 30.

The electrode assembly 10 may be housed in the can 20 which has an open upper surface to house the electrode assembly 10. The open upper surface of the can 20 may be sealed by the cap plate 30 and the first electrode and the second electrode 35 may be formed on the cap plate 30. For example, the first electrode may be the cap plate 30, itself, and the second electrode 35 may penetrate the cap plate 30. In this case, an insulator may be arranged between the second electrode 35 and the cap plate 30 which corresponds to the first electrode. The first electrode and the second electrode 35 may be electrically connected to the first and second electrode plates 11 and 13 through the first and second electrode tabs 17 and 19 of the electrode assembly 10, respectively.

The protection circuit board 140 may be mounted on the cap plate 30. The protection circuit board 140 may control charge and discharge operations of the secondary battery and may, for example, detect any abnormal situation such as overcharge, over-discharge, and overheating based on information received about the state of the secondary battery. Further, the protection circuit board 140 may protect the secondary battery by stopping the charge and discharge operations, for example.

A lead member 130 may be arranged between the protection circuit board 140 and the cap plate 30, which corresponds to the first electrode, and may electrically connect the protection circuit board 140 and the cap plate 30 to each other. A temperature safety element 120 may be arranged between the protection circuit board 140 and the second electrode 35. The temperature safety element 120 may be located on a path in which charge and discharge currents flow and may include a variable resistor in which resistance properties change according to a temperature. The temperature safety element 120 may prevent accidents such as explosion or ignition by forcibly reducing or blocking the charge and discharge currents when the secondary battery is overheated.

Terminals 145 may be on the protection circuit board 140 and may be exposed to the outside through the external terminals 150 of the case 160. The terminals 145 may be connected to a connector of a set device to provide driving power to the set device or to transmit signals to the set device that are necessary for the charge and discharge currents. The external terminal 150 may, alternatively, be an element including the terminal 145 instead of a terminal hole for exposing the terminal 145. This distinction is noted since, in the assembled secondary battery, the terminal hole as observed from the outside may be understood as the external terminal 150 including the terminal 145.

The main body 100 of the secondary battery may include the first surface 101, on which the external terminals 150 are open, and the second surface 102 opposite to the first surface 101. In more detail, the main body 100 may include main surfaces located on different sides of the secondary battery and the first and second surfaces 101 and 102 may be the main surfaces. When a shape of the secondary battery is a rectangular parallelepiped, for example, the main surface of the secondary battery may be a surface having a largest area among surfaces of the secondary battery.

Exposing the first surface 101 of the secondary battery through the external terminal 150 means that the first surface 101 may be connected via the external terminal 150. For example, the secondary battery may be mounted on the set device and may provide driving power to the set device. In this case, the connector of the set device is arranged to face the first surface 101 of the secondary battery and may be electrically connected to the external terminal 150. With regard to an assembly orientation of the secondary battery, the secondary battery may be arranged in a correct assembly orientation such that the external terminals 150 of the secondary battery face the connector of the set device, for example.

The cover 170 may be connected to a side of the main body 100, for example, a lower portion of the main body 100 located at a side opposite to the case 160. The cover 170 may include an inner surface I facing the main body 100 and an outer surface O opposite to the inner surface I. A reverse insertion protection part 173 (in FIGS. 2 and 4) may be on the outer surface O of the cover 170 and may prevent the secondary battery from being incorrectly assembled with the set device. The reverse insertion protection part 173 may be eccentric to the first surface 101 or the second surface 102 of the main body 100 of the secondary battery. The reverse insertion protection part 173 that is eccentric to one of the first surface 101 and the second surface 102 matches a housing part at a location of the set device corresponding to the reverse insertion protection part 173. Thus, the first surface 101, on which the external terminals 150 are open, may be correctly positioned. That is, the external terminals 150 of the secondary battery may be electrically connected to the connector of the set device when in a correct position where the external terminal 150 faces the connector. For example, the reverse insertion protection part 173 may be at a location which is eccentric to the second surface 102, that is, a location which is eccentric to a surface opposite to the external terminal 150.

The cover 170 may be shaped as a plate, for example, including the inner surface I and the outer surface O at different sides. A surface of the cover 170 which faces the can 20 may be the inner surface I, for example, and a surface opposite to the inner surface I may be the outer surface O, for example. In more detail, the cover 170 may include a base plate 171 on the outer surface O and the reverse insertion protection part 173 and the skirt part 175 on the inner surface I of the cover 170.

The reverse insertion protection part 173 may be on the outer surface O of the cover 170 and may include protrusions, for example, protruding from the outer surface O of the cover 170. The outer surface O of the cover 170 may have an asymmetrical shape with respect to a central line C (as shown in FIG. 3) due to the presence of the reverse insertion protection part 173. That is, since the reverse insertion protection part 173 is at the location eccentric to the first surface 101 or the second surface 102 with respect to the central line C, the outer surface O of the cover 170 including the reverse insertion protection part 173 may be asymmetric.

The skirt part 175 may be on the inner surface I of the cover 170. For example, the skirt part 175 may protrude from the inner surface I of the cover 170. The inner surface I of the cover 170 may have an asymmetrical shape with respect to the central line C due to the presence of the skirt part 175. In this case, the skirt part 175 may be at the location eccentric to the first surface 101 or the second surface 102 with respect to the central line C of the cover 170. For example, the skirt part 175 may be at a location eccentric to the first surface 101 with respect to the central line C.

In an exemplary embodiment, the skirt part 175 may be at the location eccentric to the first surface 101 of the main body 100 and the reverse insertion protection part may be at the location eccentric to the second surface 102 of the main body 100. That is, the skirt part 175 and the reverse insertion protection part 173 may be positioned at different locations that are respectively eccentric to the first surface 101 and the second surface 102 of the main body 100. The reverse insertion protection part 173 may induce or establish an orientation of the secondary battery. That is, an assembly orientation of the secondary battery such that the first surface 101, on which the external terminal 150 is open, faces the connector of the set device may be determined.

The main body 100 and the cover 170 should be arranged with respect to each other such that the reverse insertion protection part 173 of the cover 170 may perform its intended functions. For example, when the reverse insertion protection part 173 of the cover 170 is supposed to face the second surface 102 of the main body 100, but mistakenly faces the first surface 101 of the main body 100 due to an incorrect assembly of the cover 170, the external terminal 150 of the first surface 101 and the connector of the set device may not connect to each other, notwithstanding the presence of the reverse insertion protection part 173.

The skirt part 175 may provide an identification element for identifying an assembly orientation of the cover 170. That is, the skirt part 175 is at an eccentric location of the cover 170 and may identify the first surface 101 and the second surface 102 of the cover 170. For example, when the cover 170 and the main body 100 (in more detail, the external terminals 150) are assembled in a correct orientation, as identified through exterior observation of the skirt part 175, the external terminal 150 and the set device may be assembled through interference of the insertion protection part 173.

In an exemplary embodiment, an orientation of the cover 170 may be identified and corrected by forming the skirt part 175 at an asymmetric location of the cover 170. That is, through the exterior observation of the secondary battery, an orientation of the cover 170 may be easily identified and, thus, it may be determined whether the cover 170 is incorrectly assembled.

The skirt part 175 may protrude from the base plate 171 toward the main body 100 and may cover a portion of the first surface 101 or the second surface 102 of the main body 100. In more detail, the skirt part 175 may cover a portion of the first surface 101 or the second surface 102 of the can 20. The skirt part 175 may be integrally formed with the base plate 171 and may protrude therefrom.

The skirt part 175 may be located along a lengthwise direction of the base plate 171. The lengthwise direction of the base plate 171 may be a lengthwise direction of the first surface 101 or the second surface 102 of the main body 100. That is, the skirt part 175 may be at a location eccentric to the first surface 101 or the second surface 102 of the main body 100 and may extend in a direction parallel to the first surface 101 or the second surface 102.

The cover 170 may include a pair of long-side surfaces L, which extend parallel to the first surface 101 or the second surface 102, and a pair of short-side surfaces S alternately disposed between the long-side surfaces L. In this case, the skirt part 175 may be on any one of the long-side surfaces L, that is, a long-side surface L that is close to either one of the first surface 101 and the second surface 102 of the main body 100. The short-side surfaces S may connect the long-side surfaces L with a curve, for example.

The skirt part 175 may be at the location eccentric to the first surface 101 or the second surface 102 of the main body 100. For example, the skirt part 175 may be at the location eccentric to the first surface 101, but not at the location eccentric to the second surface 102. In other words, the skirt part 175 may be on any one of the long-side surfaces L, but not on both of the long-side surfaces L. The skirt part 175 is a mark or identifier indicating the orientation of the cover 170 and, thus, may be on any one of the long-side surfaces L.

Figure 5A:
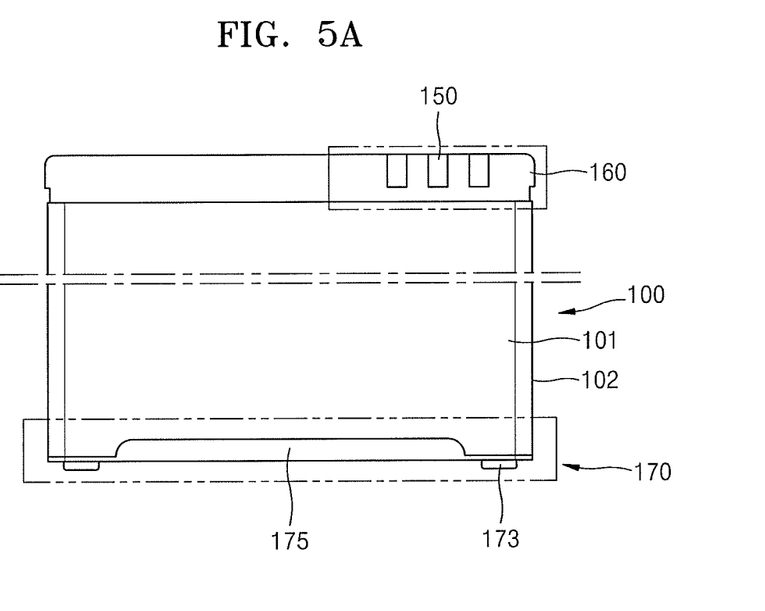
FIGS. 5A and 5B respectively illustrate views showing a state in which an assembly orientation of a cover is correct and a state in which an assembly orientation of a cover is incorrect.
Figure 5B:
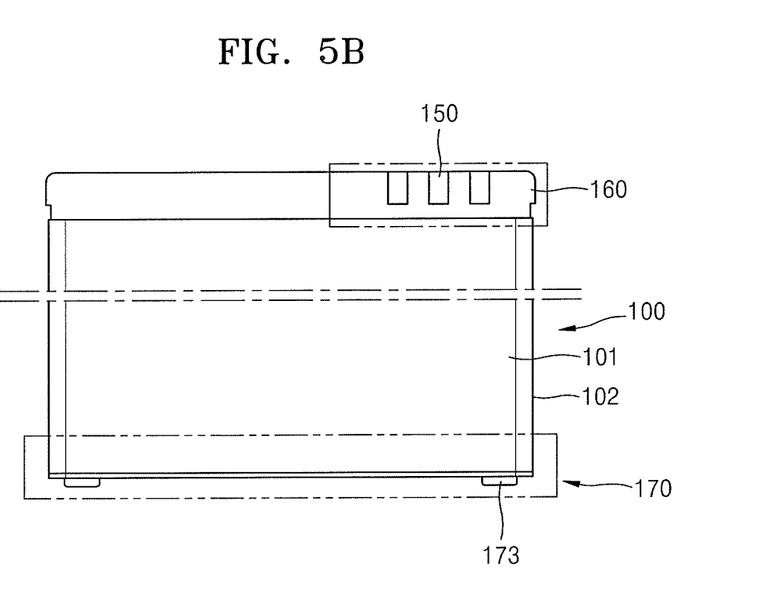

FIGS. 5A and 5B are views respectively illustrating a state, in which an assembly orientation of the cover 170 is correct and a state in which an assembly orientation of the cover 170 is incorrect.

As shown in FIG. 5A, when the skirt part 175 is identified as being on the first surface 101, on which the external terminals 150 are open, it may be considered and determined that an assembly orientation of the cover 170 is correct. On the contrary, as shown in FIG. 5B, when the skirt part 175 is not observed on the first surface 101, on which the external terminals 150 are open, it may be determined that an assembly orientation of the cover 170 is incorrect. Therefore, it is possible to check or verify an assembly state of the cover 170 by observing the first surface 101 of the secondary battery. As such, incorrect assembly of the cover 170 may be easily determined.

Figure 6:
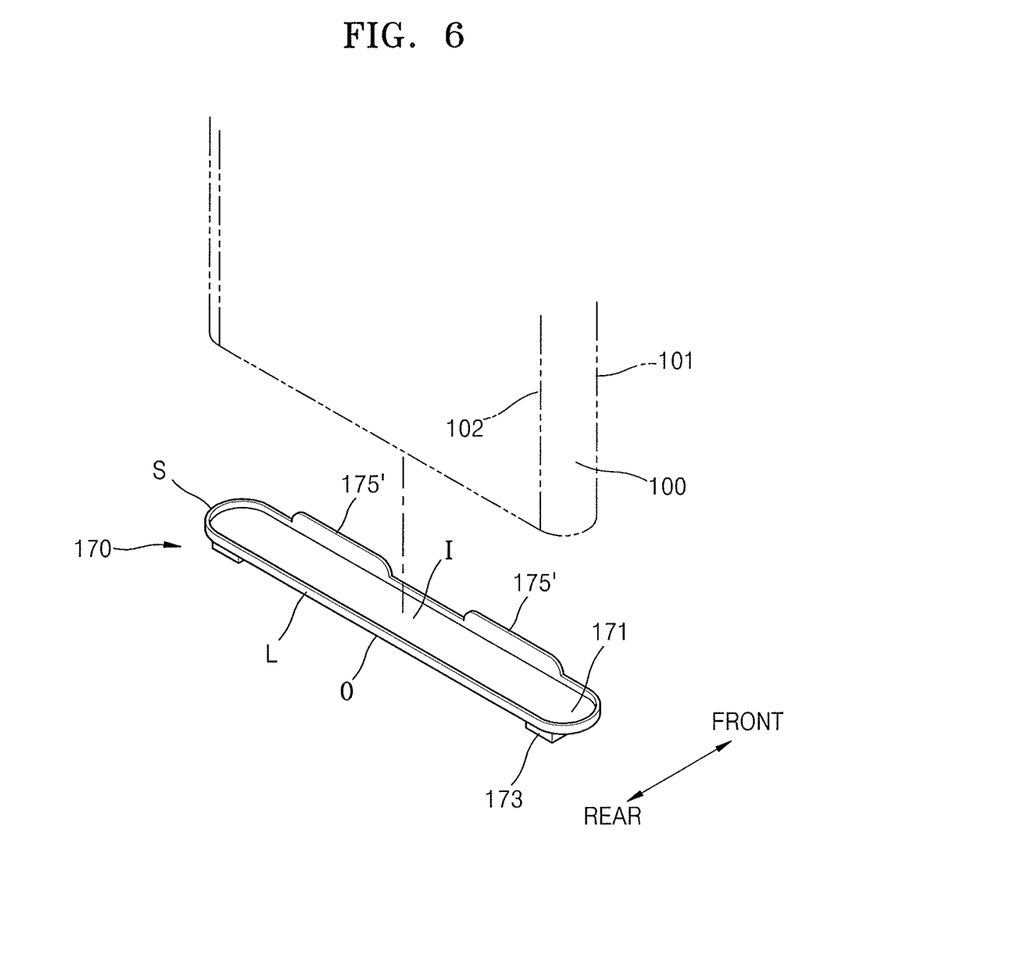
FIG. 6 illustrates a view showing a modified form of FIG. 2.

FIG. 6 is a view illustrating a modified form of FIG. 2.

Referring to FIG. 6, there may be multiple skirt parts 175'. The skirt parts 175' may be at locations eccentric to the first surface 101 or the second surface 102 of the main body 100. The skirt parts 175' may be arranged in the direction parallel to the first surface 101 or the second surface 102. It may be easy to observe an exterior of the skirt parts 175' and to verify an assembly orientation of the cover 170 through the observation, since the skirt parts 175' are spaced apart from one another.

The cover 170 may include the pair of long-side surfaces L extending parallel to the first surface 101 or the second surface 102 and the pair of short-side surfaces between the pair of the long-side surfaces L, for example. In this case, the skirt part 175' may be on any one of the long-side surfaces L. That is, the skirt part 175' may be on the long-side surface L close to one of the first surface 101 and the second surface 102, and the skirt parts 175' may be spaced apart from each other in a direction parallel to the respective long-side surface L.

Figure 7:
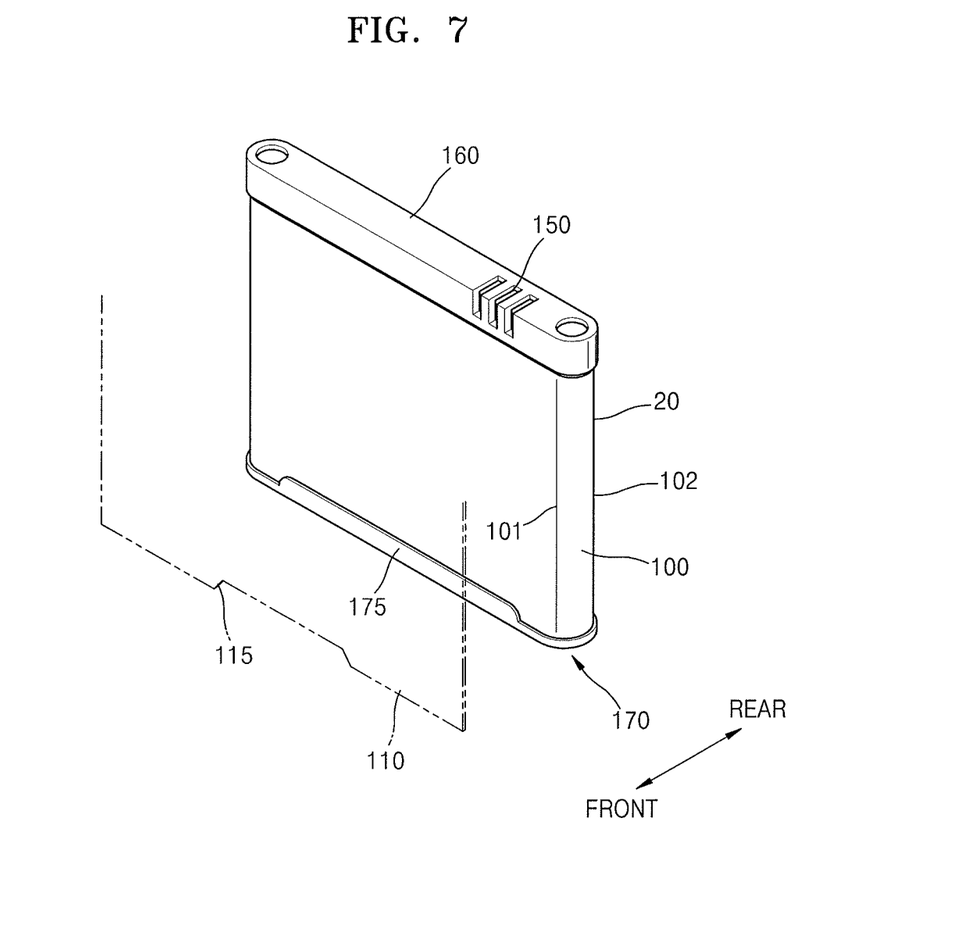
FIG. 7 illustrates an exploded perspective view of a secondary battery according to another exemplary embodiment.

FIG. 7 is an exploded perspective view of a secondary battery according to another exemplary embodiment.

Referring to FIG. 7, the secondary battery may include the main body 100 and the skirt part 175. The main body 100 includes the first surface 101, on which the external terminal 150 is open, and the second surface 102 opposite to the first surface 101. The skirt part 175 is connected to a side of the main body 100 and may be at a location eccentric to the first or second surface 101 or 102. For example, the skirt part 175 may be at a location eccentric to the first surface 101 of the main body 100.

The secondary battery may further include an external sheet 110. The external sheet 110 may surround the cover 170 and include an opening 115 for exposing the skirt part 175. The external sheet 110 may wind around or extend along the skirt part 175 and an outer circumferential surface of the main body 100 and, thus, the cover 170 may be firmly fixed. In this case, an opening 115 for exposing the skirt part 175 may be in the external sheet 110 winding the skirt part 175.

The external sheet 110 may wind around the skirt part 175 and the outer circumferential surface of the main body 100. In this case, the opening 115 may be in a location of the external sheet 110 which faces the skirt part 175. As such, the opening 115 may expose the skirt part 175.

In more detail, the opening 115 may be used to verify whether the skirt part 175 is observed during the observation of the exterior of the cover 170 and to identify an assembly orientation of the cover 170. For example, when the skirt part 175 is not observed from the first surface 101, on which the external terminals 150 are open, it may be determined that the assembly orientation of the cover 170 has an error. Thus, the opening 115 may be in the external sheet 110 to expose the skirt part 175.

With regard to a size of the opening 115, the opening 115 should be large enough to expose a portion of the skirt part 175 and small enough to allow the external sheet 110 to cover the remaining portions of the skirt part 175. For example, the opening 115 exposes a portion of the skirt part 175, thus the skirt part 175 may be identified. Also, the external sheet 110 may surround the remaining portions of the skirt part 175 such that the cover 170 may be firmly fixed.

In terms of a relationship with the set device, in order to correctly assemble the secondary battery without incorrectly arranging the first surface 101, on which the external terminals 150 are open, and the second surface 102 opposite to the first surface 101, the reverse insertion protection part 173 is located on the cover 170.

The reverse insertion protection part 173 may prevent incorrect assembly of the secondary battery, depending on a physical interference of the set device. Furthermore, since the skirt part 175 is at the location eccentric to the first surface 101 or the second surface 102, the assembly orientation of the cover 170 may be determined during the observation of the exterior of the secondary battery. Thus, the opening 115 may be in a portion of the external sheet 110 surrounding an outer circumferential surface of the can 20 and the skirt part 175 and the skirt part 175 may be exposed to the outside.

The opening 115 may be selectively located in the portion of the external sheet 110 surrounding the first surface 101 or the second surface 102. The opening 115 exposes the skirt part 175 and may be selectively located in a portion of the external sheet 110 surrounding the first surface 101 and the skirt part 175 or in a portion of the external sheet 110 surrounding the second surface 102 and the skirt part 175.

The skirt part 175 is a mark or identifier indicating the assembly orientation of the cover 170 and, thus, is selectively located on the first surface 101 or the second surface 102. The opening 115 for exposing the skirt part 175 may also be selectively located in a portion of the external sheet 110 covering the first surface 101 or the second surface 102, within a limit, for exposing the skirt part 175. That is, the opening 115 in the external sheet 110 tends to weaken a fixing force of the cover 170 generated by the external sheet 110 and, thus, it may be preferable to form the opening 115 within a certain scope.

According to whether the skirt part 175 is observed from the opening 115 of the external sheet 110 or whether the can 120 is observed without the skirt part 175, the assembly orientation of the cover 170 may be verified. For example, only when the assembly orientation of the cover 170 is correct can the secondary battery be correctly assembled with the set device according to a physical interference of the reverse insertion protection part 173. That is, when the skirt part 175 of the cover 170 is observed on the first surface 101, on which the external terminals 150 are open, during the observation of the secondary battery, it may be determined that the assembly orientation of the cover 170 is correct. However, when the skirt part 175 of the cover 170 is not observed on the first surface 101 during the observation of the secondary battery, it may be determined that the assembly orientation of the cover 170 is incorrect.

Figure 8A:
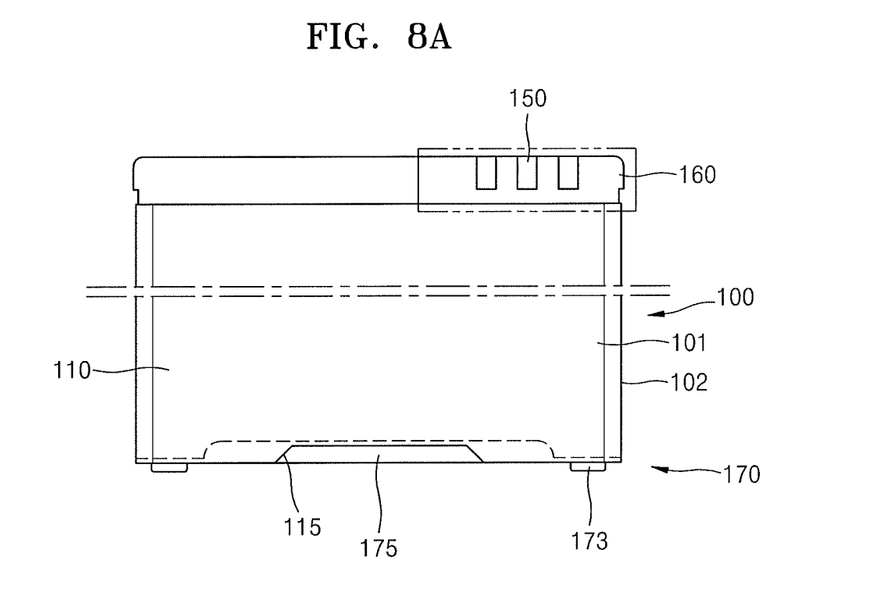
FIGS. 8A and 8B respectively illustrate views showing a state in which an assembly orientation of a cover is correct and a state in which an assembly orientation of a cover is incorrect.
Figure 8B:
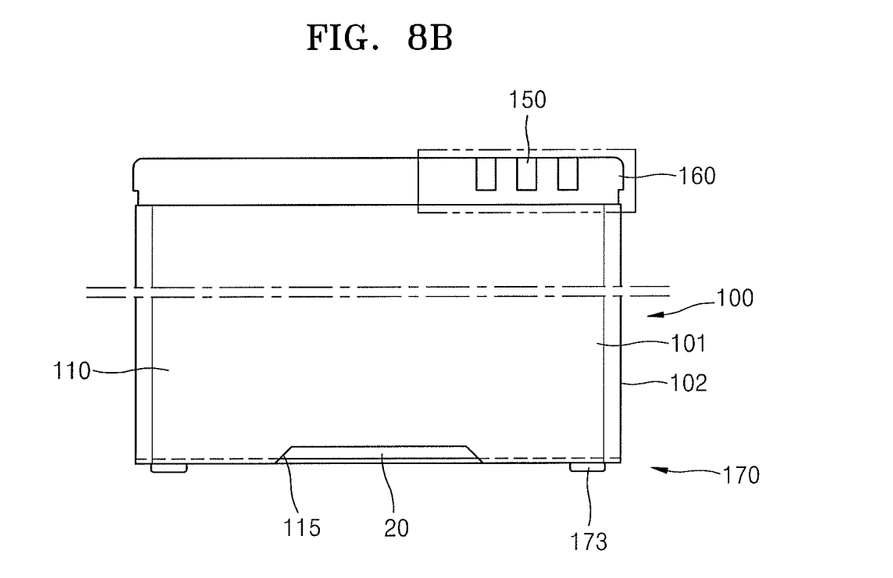

FIGS. 8A and 8B are views respectively illustrating a state in which an assembly orientation of the cover 170 is correct and a state in which an assembly orientation of the cover 170 is incorrect.

As shown in FIG. 8A, when the skirt part 175 of the cover 170 is observed through the opening 115 of the external sheet 110 to be on the first surface 101, on which the external terminals 150 are open, it may be determined that the assembly orientation of the cover 170 is correct. On the contrary, as shown in FIG. 8B, when the skirt part 175 of the cover 170 is not observed through the opening 115 of the external sheet 110 to be on the first surface 101, on which the external terminals 150 are open, and, instead, the can 20 is observed, it may be determined that the assembly orientation of the cover 170 is incorrect.

As described above, if the assembly orientation of the cover 170 is correct, then the external terminal 150 of the secondary battery may be correctly connected to the connector of the set device by verifying whether an interference between the reverse insertion protection part 173 on the cover 170 and the set device exists.

Figure 9:
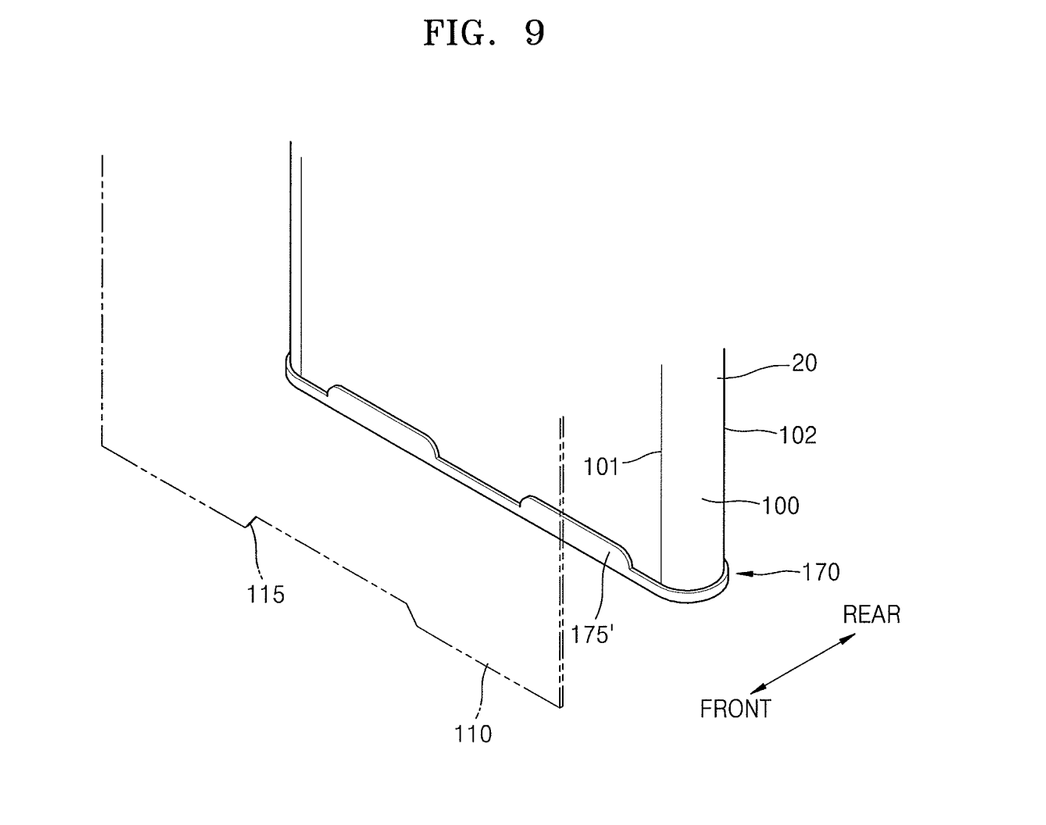
FIG. 9 illustrates a view showing a modified form of FIG. 7.

Although a location of the opening 115 of the external sheet 110 is slightly different from that of the skirt part 175, if the skirt part 175 extends long, it may be easy to observe the skirt part 175. If one skirt part 175 extends long, the external sheet 110 surrounds the outer circumferential surface of the can 20 and the skirt part 175 and, thus, a force for fixing the cover 170 on the outer circumferential surface of the can 20 may be weakened. As shown in FIG. 9, since the skirt parts 175' are spaced apart from each other, the external sheet 110 may surround the outer circumferential surface of the can 20 through respective gaps between the skirt parts 175'.

Figure 10:
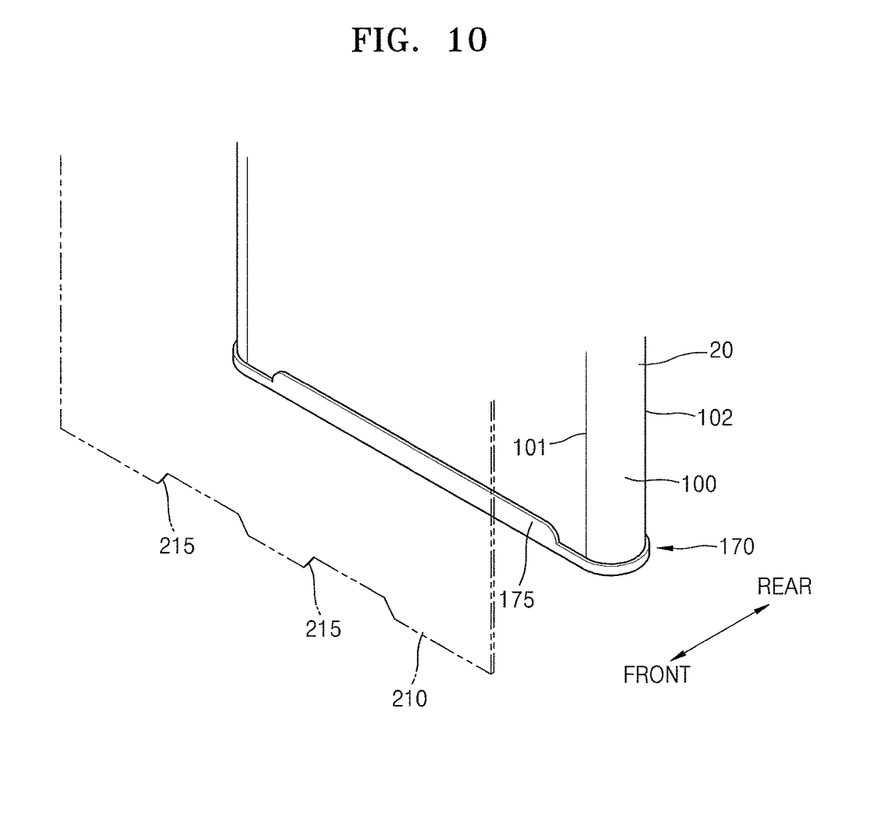
FIG. 10 illustrates a view showing another modified form of FIG. 7.

FIG. 10 is a view illustrating another modified form of FIG. 7.

Referring to FIG. 10, the secondary battery may include the main body 100 and the skirt part 175. The main body 100 may have the first surface 101 including the external surface having an open portion and the second surface 102 opposite to the first surface 101. The skirt part 175 is connected to a side of the main body 100 and is at a location eccentric to any one of the first surface 101 or the second surface 102. Also, the secondary battery winds around or extends along the cover 170 and may further include an external sheet 210 having an opening 215 for exposing the skirt part 175.

Two or more openings 215 may be in the external sheet 210. For example, the external sheet 210 may include the openings 215 that are spaced apart from each other in a direction parallel to the first surface 101 or the second surface 102. For example, the skirt part 175 may be at a location eccentric to the first surface 101 of the main body 100 and the openings 215, which are spaced apart from each other in a direction parallel to the first surface 101, may be in the external sheet 210.

It may be necessary to locate the openings 215 such that the openings 215 have enough length to verify the existence of the skirt part 175, even if there are positioning tolerances between the skirt part 175 and the openings 215. Since the external sheet 210 is used to fix the cover 170 by fixing the position of the skirt part 175, it may be preferable to shorten a length of the opening 215 such that the location of the cover 170 is fixed. Thus, the existence of the skirt part 175 may be verified through the openings 215 without any omission since the openings 215 have a small length.

By way of summation and review, small mobile devices such as cell phones may operate for a predetermined time according to the output and capacity of a battery. However, when a large operation time and power are required, for example, in the case of electric vehicles or hybrid vehicles, secondary batteries of a pack type that include a plurality of batteries are preferable because of the output and capacity of the batteries and, according to the number of included batteries, an output voltage or an output current may increase.

The secondary batteries are mounted in a set device and may provide driving power thereto. The secondary batteries need to be well aligned within the set device for a smooth electrical connection between the set device and the external terminal of the secondary batteries, which forms a path of charge and discharge currents.

According to the exemplary embodiments, a secondary battery and a set device may be easily arranged by arranging an assembly orientation of a main body of the secondary battery and a cover.

Exemplary embodiments may include a secondary battery that may easily detect whether an assembly orientation of components has any error through observation, and the secondary battery may be well aligned within a set device by correctly aligning an assembly orientation of components.

In the secondary battery of the exemplary embodiments, a mark indicating an assembly orientation of the cover is provided to easily identify any assembly error occurring between the cover and a main body of the secondary battery which includes external terminals. Accordingly, an error of the assembly orientation in which the cover and the main body of the secondary battery are arranged may be easily found during observation of an exterior of the secondary battery.

In the secondary battery of the exemplary embodiments, the secondary battery may be easily assembled with a set device by arranging the assembly orientation in which the cover and the main body of the secondary battery are arranged and, thus, the secondary battery may provide for a smooth electrical connection between the external terminals of the secondary battery and the set device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery comprising:
    a main body including a first surface and a second surface opposite to the first surface; and
    a cover connected to a side of the main body and including a skirt part at an eccentric location toward only one of the first and second surfaces such that the skirt part extends on only one of the first surface or the second surface and does not extend on the other of the first surface or the second surface,
    wherein an external terminal faces a same direction as the first surface.

2. The secondary battery as claimed in claim 1, wherein:
    the cover includes an inner surface facing the main body and an outer surface opposite to the inner surface, and
    the skirt part protrudes from the inner surface.

3. The secondary battery as claimed in claim 2, wherein the inner surface of the cover has an asymmetrical shape.

4. The secondary battery as claimed in claim 3, wherein a reverse insertion protection part is on the outer surface of the cover.

5. The secondary battery as claimed in claim 4, wherein the reverse insertion protection part is at an eccentric location toward one of the first and second surfaces.

6. The secondary battery as claimed in claim 5, wherein an outer surface of the cover has an asymmetrical shape.

7. The secondary battery as claimed in claim 5, wherein:
    the skirt part is at an eccentric location toward the first surface, and
    the reverse insertion protection part is at an eccentric location toward the second surface.

8. The secondary battery as claimed in claim 1, wherein:
    the main body further includes:
        an electrode assembly; and
        a can housing the electrode assembly, and
    the skirt part covers a first or second surface of the can.

9. The secondary battery as claimed in claim 1, wherein:
    the cover further includes:
        a pair of long-side surfaces extending in parallel to the first and second surfaces; and
        a pair of short-side surfaces alternately between the pair of long-side surfaces, and
    the skirt part is selectively located on only one of the long side surfaces of the pair of long-side surfaces.

10. The secondary battery as claimed in claim 9, wherein the skirt part comprises at least two skirt parts spaced apart from each other along only one of the long-side surfaces.

11. The secondary battery as claimed in claim 1, further comprising an external sheet winding around the cover and including an opening for exposing the skirt part.

12. The secondary battery as claimed in claim 11, wherein the external sheet covers a portion of the main body and the skirt part.

13. The secondary battery as claimed in claim 11, wherein the opening is selectively located in the external sheet covering the main body.

14. The secondary battery as claimed in claim 11, wherein a plurality of skirt parts are on the cover.

15. An electronic device including a connector and secondary battery as claimed in claim 4, wherein:
- the external terminal of the secondary battery is electrically connected to the connector, and
- the electronic device accommodates the secondary battery in a space therein, the space being complementary in shape to the secondary battery such that the secondary battery fits in the space when one of the first surface or the second surface faces an interior of the space and does not fit in the space when the other of the first surface or the second surface faces the interior of the space due to interference by the reverse insertion protection part.

* * * * *